(12) United States Patent
Akagi et al.

(10) Patent No.: US 9,506,794 B2
(45) Date of Patent: Nov. 29, 2016

(54) FLOW RATE MEASURING DEVICE

(71) Applicant: Mitsubishi Electric Corporation, Tokyo (JP)

(72) Inventors: Kazuto Akagi, Tokyo (JP); Naoyuki Kishikawa, Tokyo (JP); Hiroyuki Uramachi, Tokyo (JP); Hiroshi Sakanoue, Tokyo (JP); Masahiro Kawai, Tokyo (JP); Yuji Ariyoshi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 65 days.

(21) Appl. No.: 14/696,553

(22) Filed: Apr. 27, 2015

(65) Prior Publication Data

US 2016/0116314 A1    Apr. 28, 2016

(51) Int. Cl.
| | | |
|---|---|---|
| *G01F 1/68* | (2006.01) | |
| *G01F 5/00* | (2006.01) | |
| *G01F 1/684* | (2006.01) | |
| *G01F 1/692* | (2006.01) | |
| *G01F 15/12* | (2006.01) | |

(52) U.S. Cl.
CPC ............ *G01F 5/00* (2013.01); *G01F 1/6842* (2013.01); *G01F 1/692* (2013.01); *G01F 15/12* (2013.01)

(58) Field of Classification Search
USPC ......... 73/204.23, 202, 202.5, 204.21, 861.19
See application file for complete search history.

(56) References Cited

U.S. PATENT DOCUMENTS

| | | | | |
|---|---|---|---|---|
| 4,930,357 A | * | 6/1990 | Thurston ............... | G01F 1/3227 137/833 |
| 5,942,683 A | * | 8/1999 | Aoi ........................ | F02M 69/48 73/202 |
| 7,089,788 B2 | * | 8/2006 | Yonezawa ............. | G01F 1/6842 73/114.32 |
| 7,383,740 B2 | * | 6/2008 | Krasilchikov ......... | A61B 5/087 73/861.19 |
| 7,942,052 B2 | * | 5/2011 | Ariyoshi ................ | G01F 1/72 73/202.5 |
| 8,695,409 B2 | * | 4/2014 | Kohno ................... | G01F 1/6842 73/114.32 |

FOREIGN PATENT DOCUMENTS

| | | |
|---|---|---|
| JP | 3797210 B2 | 7/2006 |
| JP | 4161077 B2 | 10/2008 |

* cited by examiner

*Primary Examiner* — Jewel V Thompson
(74) *Attorney, Agent, or Firm* — Sughrue Mion, PLLC; Richard C. Turner

(57) ABSTRACT

A flow rate measuring device includes: a bypass passage; a flow rate detecting element; and a flow rate measuring circuit. The bypass passage includes: an inflow port; an outflow port; and a plurality of bent portions. The plurality of bent portions include first to third bent portions for forming U-shapes, and a fourth bent portion for bending the bypass passage bent at the third bent portion so as to be parallel to a mainstream flowing direction. The flow rate detecting element is arranged inside the bypass passage in a part after bending at the fourth bent portion. A route connecting the inflow port and the flow rate detecting element as a straight line is blocked by an inner wall surface of the bypass passage on an outer peripheral side, which is formed between the first bent portion and the second bent portion.

10 Claims, 6 Drawing Sheets

FLOW RATE MEASURING DEVICE

BACKGROUND OF THE INVENTION

1. Field of the Invention

The present invention relates to a flow rate measuring device, and, for example, relates to a device for measuring a mass flow rate of air in an internal combustion engine.

2. Description of the Related Art

As a thermosensitive flow rate measuring device configured to be mounted on an intake pipe of an internal combustion engine to measure a flow rate of intake air, there is known a device including a flow rate detecting element arranged inside a measuring passage (hereinafter referred to as "bypass passage") for partially taking in the intake air. Such a flow rate measuring device uses, as the flow rate detecting element, a semiconductor element including a flow rate detecting portion formed of a thin film of several micrometers.

In the thermosensitive flow rate measuring device, dust mixed into the intake air sometimes enters the intake pipe. Then, when dust with a particle size of 100 μm or more enters the bypass passage together with the intake air and collides with the flow rate detecting portion at high speed, the flow rate detecting portion may be damaged to cause failure of the flow rate measuring device. In order to solve this problem, various structures have been proposed (for example, see Japanese Patent Nos. 4161077 and 3797210).

In the flow rate measuring device disclosed in Japanese Patent No. 4161077, the bypass passage is substantially perpendicularly bent twice, and the flow rate detecting element is arranged inside the bypass passage in a downstream part. The flow rate measuring device of Japanese Patent No. 4161077 has a structure in which the bypass passage is bent. Thus, the dust is caused to collide with the wall surface of the bypass passage so as to reduce the collision energy of dust against the flow rate detecting element.

Further, in the flow rate measuring device disclosed in Japanese Patent No. 3797210, a guide louver is installed inside the bypass passage in a part positioned on the upstream with respect to the flow rate detecting element. The flow rate measuring device disclosed in Japanese Patent No. 3797210 uses the effect of the guide louver to prevent the dust, which has collided with the wall surface of the bypass passage to bounce and fly toward the flow rate detecting element, from colliding with the flow rate detecting element.

However, the related art has the following problems.

As disclosed in Japanese Patent Nos. 4161077 and 3797210, in the related-art flow rate measuring device, various structures have been proposed to prevent damage of the flow rate detecting element due to dust mixed into air being a fluid to be measured.

However, in the flow rate measuring device disclosed in Japanese Patent No. 4161077, there has been a problem in that, when the dust enters the bypass passage at an angle linearly connecting the inflow port of the bypass passage and the flow rate detecting element, the dust may directly reach the flow rate detecting element without colliding with the wall surface of the bypass passage.

Further, in the flow rate measuring device disclosed in Japanese Patent No. 3797210, because a plate-like member is installed inside the bypass passage, the pressure loss caused inside the bypass passage increases, and hence the flow velocity of air passing above the flow rate detecting element is reduced. As a result, the air flowing through the bypass passage cannot absorbs a sufficient amount of heat from the flow rate detecting element to detect the flow rate, which causes a problem in that the flow rate measuring range is narrowed.

SUMMARY OF THE INVENTION

The present invention has been made to solve the problems described above, and has an object to obtain a flow rate measuring device that is capable of sufficiently reducing the collision energy of dust that has entered the bypass passage, to thereby prevent a flow rate detecting element from being damaged due to the collision of the dust against the flow rate detecting element at high speed, and capable of suppressing the reduction in the flow velocity of air passing above the flow rate detecting element.

According to one embodiment of the present invention, there is provided a flow rate measuring device, including: a bypass passage for causing a fluid to be measured, which flows through a mainstream path, to partially flow through the bypass passage as a bypass fluid; a flow rate detecting element arranged inside the bypass passage; and a flow rate measuring circuit arranged outside the bypass passage, the flow rate measuring circuit being electrically connected to the flow rate detecting element so as to measure a flow rate of the fluid to be measured from a result detected by the flow rate detecting element based on a fluid passing above the flow rate detecting element. The bypass passage includes: an inflow port opposed to an upstream side in a mainstream flowing direction of the fluid to be measured and opened in a plane perpendicular to the mainstream flowing direction, for guiding the bypass fluid into the bypass passage; an outflow port for causing the bypass fluid that has passed through the bypass passage to join with the mainstream path; and a plurality of bent portions formed between the inflow port and the outflow port so as to bend the bypass passage. The plurality of bent portions includes: a first bent portion for bending the bypass passage connected to the inflow port in a direction to separate from the flow rate measuring circuit; a second bent portion for bending the bypass passage bent at the first bent portion so as to be parallel to the mainstream flowing direction; a third bent portion for bending the bypass passage bent at the second bent portion in a direction of the flow rate measuring circuit so as to be perpendicular to the mainstream flowing direction; and a fourth bent portion for bending the bypass passage bent at the third bent portion so as to be parallel to the mainstream flowing direction. The flow rate detecting element is arranged inside the bypass passage in a part after bending at the fourth bent portion. A route connecting the inflow port and the flow rate detecting element as a straight line is blocked by an inner wall surface of the bypass passage on an outer peripheral side, which is formed between the first bent portion and the second bent portion.

According to one embodiment of the present invention, the flow rate measuring device has a structure in which the bypass passage is bent a plurality of times so that a route linearly connecting the inflow port of the bypass passage and the flow rate detecting element is blocked by the bent bypass passage, and the reduction in the flow velocity value of the air passing above the flow rate detecting element through the bypass passage is suppressed. As a result, it is possible to obtain the flow rate measuring device that is capable of sufficiently reducing the collision energy of dust that has entered the bypass passage, to thereby prevent the flow rate detecting element from being damaged due to the collision of dust against the flow rate detecting element at high speed, and capable of suppressing the reduction in the flow velocity of air passing above the flow rate detecting element.

DETAILED DESCRIPTION OF THE PREFERRED EMBODIMENTS

Now, flow rate measuring devices according to exemplary embodiments of the present invention are described with reference to the drawings.

Note that, the flow rate measuring devices represented in the present invention are used for measuring the flow rate of a fluid to be measured flowing through an intake pipe, and, for example, are used for measuring the flow rate of air flowing through the intake pipe of an internal combustion engine. Further, the present invention has a technical feature in the structure of the bypass passage that is capable of preventing the flow rate detecting element from being damaged due to the collision of the dust against the flow rate detecting element at high speed, and capable of suppressing the reduction in the flow velocity of air passing above the flow rate detecting element.

First Embodiment

Figure 1:
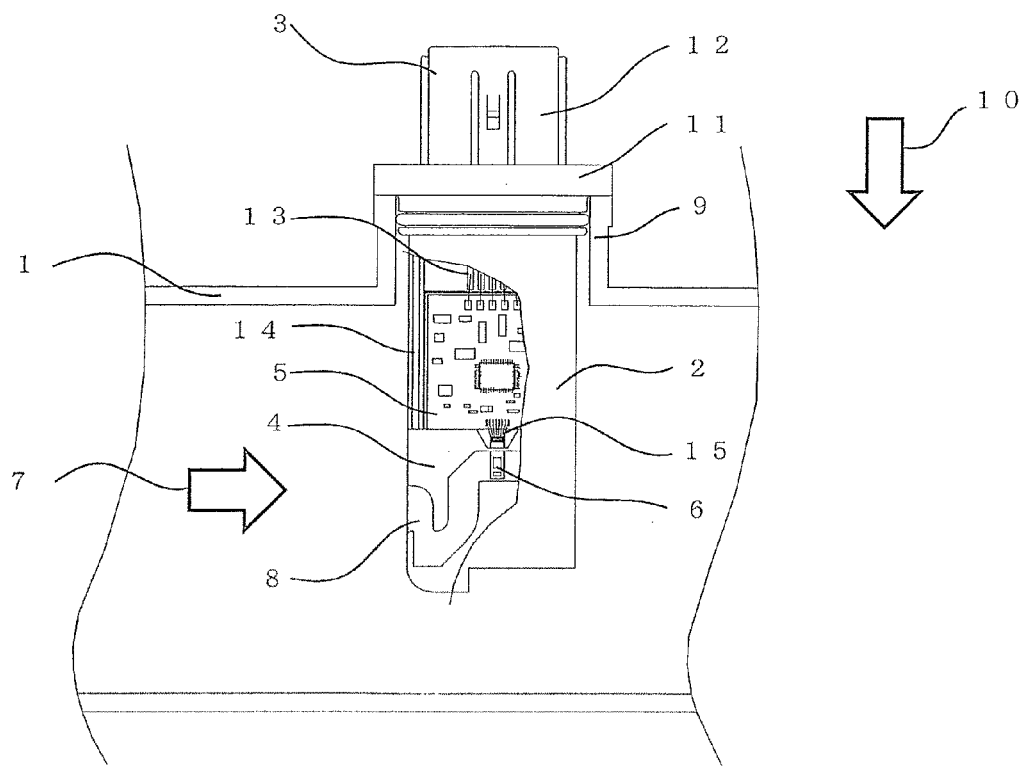
FIG. 1 is a front view with a partial cutout of a flow rate measuring device according to a first embodiment of the present invention.

FIG. 1 is a front view with a partial cutout of a flow rate measuring device according to a first embodiment of the present invention. The flow rate measuring device includes respective components of a cover 2, a base 3, a plate 4, a circuit board 5, and a flow rate detecting element 6. The cover 2 and the plate 4 are assembled to each other with an adhesive or the like to form a bypass passage 8 for partially taking in intake air 7. In this case, as the material for the cover 2, the base 3, and the plate 4, a PBT resin is used, for example.

A through hole 9 for mounting the flow rate measuring device is formed through an intake pipe 1. Further, the flow rate measuring device of the first embodiment is mounted to the intake pipe 1 as follows. The flow rate measuring device is inserted through the through hole 9 from outside of the intake pipe 1 in the direction of the arrow 10 indicated in FIG. 1, and a flange portion 11 of the base 3 is fixed to the intake pipe 1 with a screw (not shown) or the like.

A connector portion 12 of the base 3 is a terminal for transmitting and receiving a signal with the outside, and the other end of the base 3 is electrically connected to the circuit board 5 through wire bonding 13.

The circuit board 5 is supported and housed in a case portion 14 of the base 3. Further, the flow rate detecting element 6 is received in a groove portion of the plate 4. Further, the circuit board 5 and the flow rate detecting element 6 are electrically connected to each other through wire bonding 15. In this case, the circuit board 5 corresponds to a flow rate measuring circuit for measuring the flow rate of the fluid to be measured based on the result detected by the flow rate detecting element 6.

The semiconductor-type flow rate detecting element 6 is constructed as follows. A substrate made of silicon or the like is subjected to etching from its rear surface to form a thinned portion, and a flow rate detecting portion including a flow rate detecting resistor and a temperature compensating resistor is formed on the thinned portion. The flow rate detecting element 6 includes a heat generating resistor with a small heat capacity, and is excellent in heat insulation with respect to a support. Therefore, low power consumption and high-speed response can be achieved.

On the other hand, the flow rate detecting portion formed on the thinned portion of the flow rate detecting element 6 is susceptible to impact from the outside. In particular, when dust accelerated by the intake air 7 collides with the flow rate detecting portion of the flow rate detecting element 6 at high speed, the flow rate detecting resistor and the temperature compensating resistor may be damaged. As a result, the flow rate detecting accuracy may be lowered, and further the measurement function may be lost.

In order to solve such problems, the flow rate measuring device according to the first embodiment has a structure in which the bypass passage 8 is bent a plurality of times at an upstream stage with respect to the position at which the flow rate detecting element 6 is installed. The structure of the bypass passage 8 is described in detail below with reference to FIG. 2.

Figure 2:
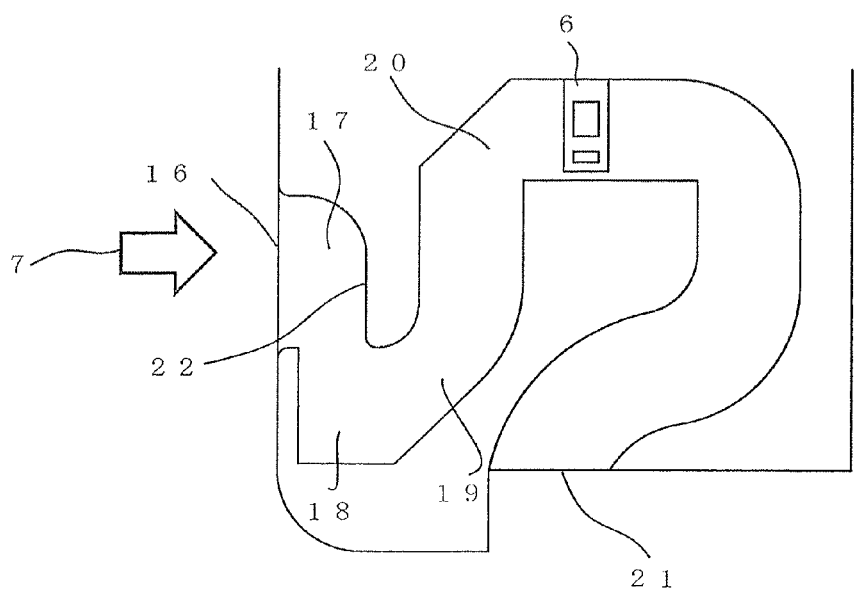
FIG. 2 is an enlarged front view of a periphery of a bypass passage of the flow rate measuring device according to the first embodiment of the present invention.

FIG. 2 is an enlarged front view of a periphery of the bypass passage of the flow rate measuring device according to the first embodiment of the present invention. The bypass passage 8 has an inflow port 16 opposed to the upstream side in a mainstream flowing direction and is opened in a plane orthogonal to the mainstream flowing direction of a main body portion. On the other hand, an outflow port 21 of the bypass passage 8 causes a bypass fluid that has passed through the bypass passage 8 to join with the mainstream path.

Further, the bypass passage in the first embodiment includes a plurality of bent portions including a first bent portion 17, a second bent portion 18, a third bent portion 19, and a fourth bent portion 20 as described below.

The first bent portion 17: a part in which the bypass passage 8 connected to the inflow port 16 is bent in a direction to separate from the case portion 14 of the base 3 housing the circuit board 5 (that is, a direction to separate from the circuit board 5).

The second bent portion 18: a part in which the bypass passage 8 bent at the first bent portion 17 is bent so as to be parallel to the mainstream flowing direction.

The third bent portion 19: a part in which the bypass passage 8 bent at the second bent portion 18 is bent in a direction of the circuit housing portion so as to be substantially perpendicular to the mainstream flowing direction.

The fourth bent portion 20: a part in which the bypass passage 8 bent at the third bent portion 19 is bent so as to be parallel to the mainstream flowing direction.

Then, the flow rate detecting element 6 is arranged immediately after the fourth bent portion 20. As described above, the plurality of bent portions are provided so that a route X-X linearly connecting the inflow port 16 and the flow rate detecting element 6 is blocked by an inner wall surface 22 of the first bent portion on the outer peripheral side. Note that, the route X-X is the same as that indicated in FIG. 4A to be described later.

Next, the effect of the bypass passage 8 in the first embodiment is described. First, as a comparative example, the effects and problems of the flow rate measuring devices disclosed in Japanese Patent Nos. 4161077 and 3797210 are described.

FIGS. 3A to 3E are views illustrating analysis results of the behavior of dust that has entered the bypass passage in the flow rate measuring device according to Japanese Patent No. 4161077. Specifically, the behavior of dust 23 having a particle size of 100 μm when the dust 23 has entered the bypass passage of the flow rate measuring device of Japanese Patent No. 4161077 is obtained through CAE analysis, which is divisionally illustrated in FIGS. 3A to 3E.

The arrow 24 indicates a motion direction of the dust 23. In normal, when the dust 23 having a particle size of about 100 μm is accelerated by the mainstream to collide with the flow rate detecting element 6, the flow rate detecting element 6 is damaged.

Figure 3A:
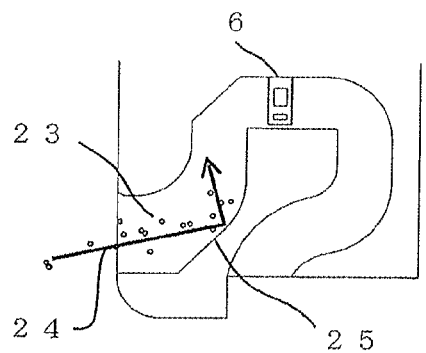
FIGS. 3A to 3E are views illustrating analysis results of the behavior of dust that has entered the bypass passage in a flow rate measuring device according to Japanese Patent No. 4161077.
Figure 3B:
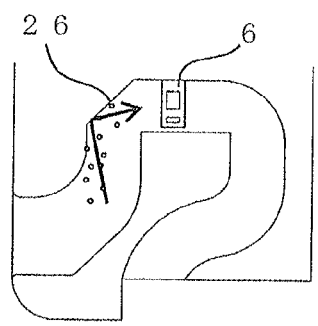

The dust 23 that has entered the bypass passage is accelerated in the flowing direction by air. The dust 23 has a larger mass than air, and hence continues the linear motion due to the inertial force in the flowing direction of the bypass passage before the bent portion. Thus, as illustrated in FIGS. 3A and 3B, the dust 23 collides with a wall surface 25 of the first bent portion and a wall surface 26 of the second bent portion. The flow rate measuring device disclosed in Japanese Patent No. 4161077 has a structure in which, as illustrated in FIGS. 3A and 3B, the dust 23 is caused to collide with the wall surface of the bypass passage to reduce the collision energy of the dust 23.

Figure 3C:
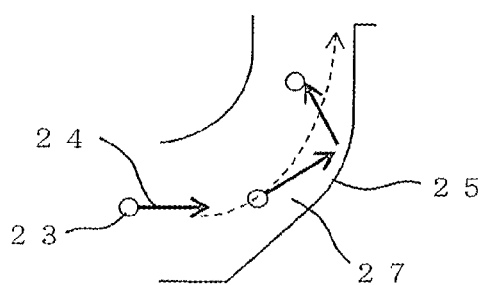

However, as illustrated in FIG. 3C, the dust 23 accelerates in the air flowing direction due to a flow 27 of the air at a wall surface portion of each bent portion. Therefore, in an actual case, the dust 23 does not substantially perpendicularly collide with the wall surface of the bypass passage as illustrated in FIG. 3A, and thus the effect of reducing the collision energy of the dust 23 through collision against the wall surface of the bypass passage is reduced.

Figure 3D:
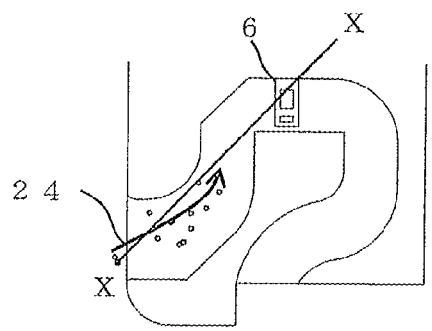
Figure 3E:
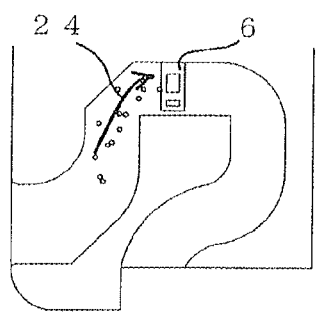

Further, as illustrated in FIGS. 3D and 3E, when the dust 23 flows into the bypass passage, the dust 23 flying in the linear route X-X from the inflow port 16 toward the flow rate detecting element 6 and the dust 23 that has a small particle size and thus moves along with the air flow reach the flow rate detecting element 6 without colliding with the wall surface of the bypass passage.

From the above-mentioned reasons, in the flow rate measuring device disclosed in Japanese Patent No. 4161077, the collision energy of the dust 23 cannot be sufficiently reduced. Therefore, when the dust 23 collides with the flow rate detecting element 6, the flow rate detecting element 6 is damaged.

Further, in the flow rate measuring device disclosed in Japanese Patent No. 3797210, a guide louver is installed inside the bypass passage on the upstream side of the flow rate detecting element 6. Thus, the dust is prevented from reaching the flow rate detecting element due to the bouncing after the collision against the wall surface of the bypass passage.

However, because the guide louver is arranged inside the bypass passage, the frictional influence that the air receives from the wall surface increases. Thus, the pressure loss caused inside the bypass passage increases. Hence, the flow velocity value of air after passing the inflow port portion is reduced, and the flow velocity value of air passing above the flow rate detecting element is reduced. As a result, the air flowing through the bypass passage cannot absorb a sufficient amount of heat from the flow rate detecting element in a region in which the flow velocity of the mainstream is slow, which causes a problem in that the measuring range is narrowed.

In view of this, the effect of the bypass passage in the first embodiment, which can solve those problems, is described next. FIGS. 4A to 4E are views illustrating analysis results of the behavior of dust that has entered the bypass passage 8 in the flow rate measuring device according to the first embodiment of the present invention. Specifically, the behavior of dust 23 having a particle size of 100 μm when the dust 23 has entered the bypass passage 8 of the flow rate measuring device of the first embodiment is obtained through CAE analysis, which is divisionally illustrated in FIGS. 4A to 4E.

Figure 4A:
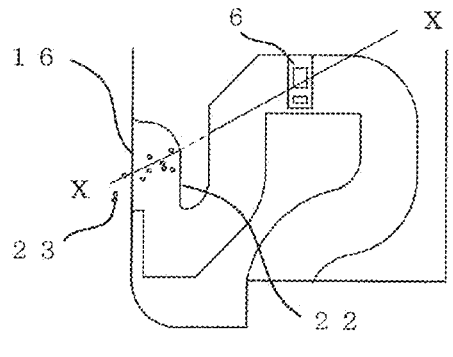
FIGS. 4A to 4E are views illustrating analysis results of the behavior of dust that has entered the bypass passage in the flow rate measuring device according to the first embodiment of the present invention.

In the flow rate measuring device of the first embodiment, as illustrated in FIG. 4A, the inner wall surface 22 of the first bent portion on the outer peripheral side is extended toward the insertion direction 10, and thus the route X-X linearly connecting the inflow port 16 and the flow rate detecting element 6 is blocked by the inner wall surface 22 of the first bent portion on the outer peripheral side.

Therefore, even when the dust 23 enters the bypass passage 8 from the inflow port 16 at any angle, the dust 23 can be caused to collide with the inner wall surface 22 of the first bent portion on the outer peripheral side. As a result, the dust 23 can be prevented from reaching the flow rate detecting element 6 without being reduced in collision energy.

Figure 4B:
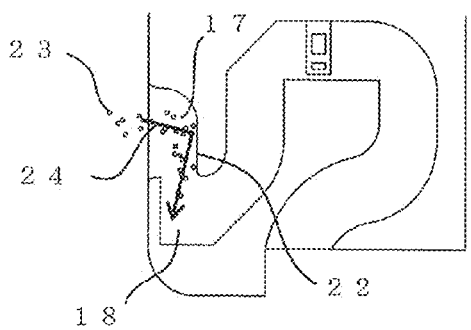

Further, as illustrated in FIG. 4B, the dust 23 that has entered from the inflow port 16 accelerates by the air flow to move in a direction to separate from the flow rate detecting element 6. That is, after the dust is once caused to move in the direction to separate from the flow rate detecting element 6, the dust is accelerated in the direction of the flow rate detecting element 6. Therefore, the collision energy that the dust 23 has at the second bent portion 18, which may damage the flow rate detecting element 6, can be reduced. Such an effect is beneficial also to the dust that has a relatively small particle size and flies along with the air flow.

Figure 4C:
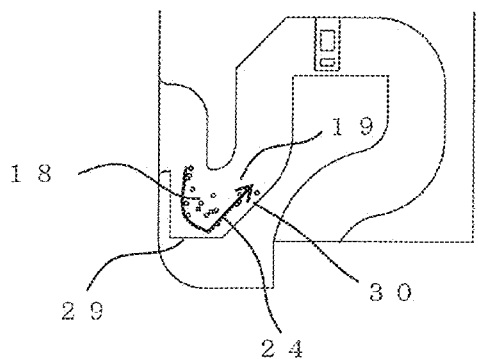
Figure 4D:
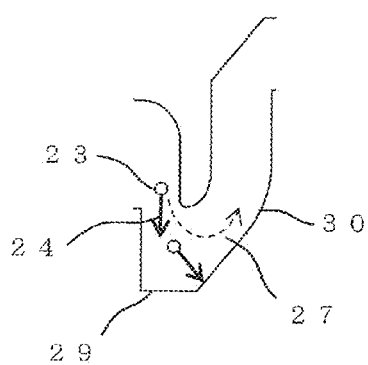
Figure 4E:
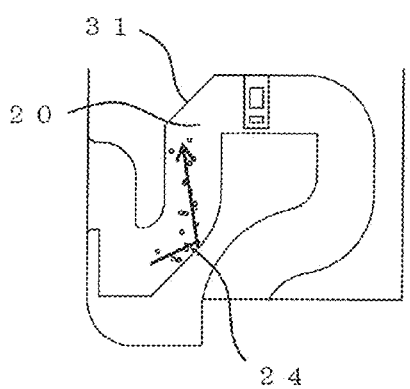

Further, as illustrated in FIG. 4C, the bypass passage 8 including the second bent portion 18 and the third bent portion 19 is formed into a U-shape, to thereby generate a large centrifugal force on the dust 23. As a result, the motion direction 24 of the dust 23 becomes a direction directed toward an inner wall surface 29 of the second bent portion on the outer peripheral side and an inner wall surface 30 of the third bent portion on the outer peripheral side. Therefore, the dust 23 may be caused to substantially perpendicularly collide with the wall surface of the bypass passage 8.

Further, as illustrated in FIGS. 4B to 4E, as compared to the flow rate measuring device disclosed in Japanese Patent No. 4161077, the flow path is bent a larger number of times until reaching the flow rate detecting element 6, and hence the number of times that the dust collides with the wall surface significantly increases. Therefore, the collision energy of the dust 23 can be reduced.

Figure 5:
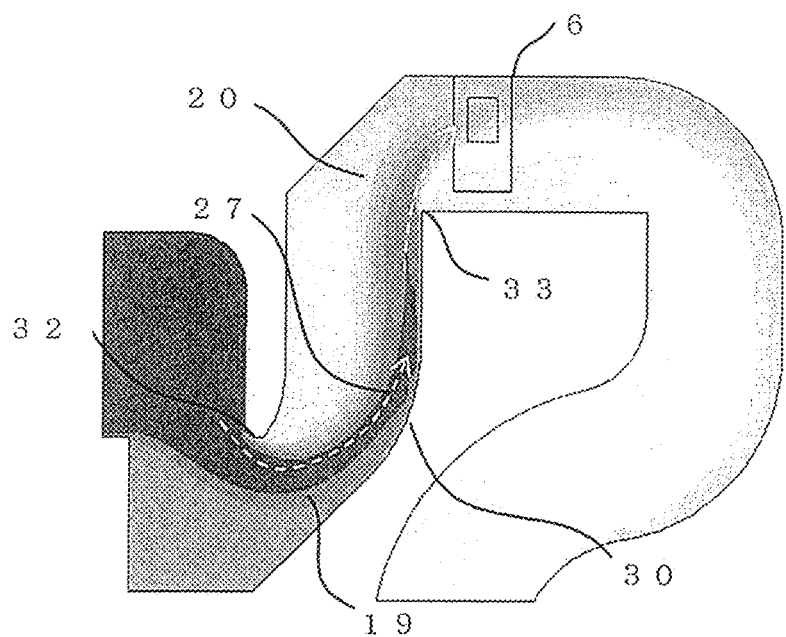
FIG. 5 is a contour graph showing the flow velocity of air inside the bypass passage, which is obtained through CAE analysis, in the flow rate measuring device according to the first embodiment of the present invention.

FIG. 5 is a contour graph showing the flow velocity of air inside the bypass passage 8, which is obtained through CAE analysis, in the flow rate measuring device according to the first embodiment of the present invention. In FIG. 5, as the region is indicated with a darker color, the flow velocity value of air is higher. Also in the bypass passage 8 of the flow rate measuring device of the first embodiment, due to the shape that is bent a plurality of times, the pressure loss of the entire bypass passage increases. However, the air is separated at an end 32 of the inner wall surface of the first bent portion on the outer peripheral side, and hence the air is contracted at the third bent portion 19. Thus, the flow velocity value of air becomes higher toward the inner wall surface 30 of the third bent portion on the outer peripheral side.

The air traveling along the inner wall surface 30 of the third bent portion on the outer peripheral side is separated at an end 33 of the inner wall surface of the fourth bent portion on an inner peripheral side to travel toward the flow rate detecting element 6. Therefore, the reduction in the flow velocity value of air passing above the flow rate detecting element 6 can be suppressed, and thus the measuring range of the flow rate measuring device is not narrowed.

As described above, according to the first embodiment, the number of times to cause the dust that has entered the bypass passage to collide with the wall surface is increased. Thus, it is possible to construct the flow rate measuring device capable of suppressing the reduction in the flow velocity inside the bypass passage while improving the dust tolerance capacity.

More specifically, the route linearly connecting the inflow port of the bypass passage and the flow rate detecting element is blocked by the inner wall surface of the first bent portion on the outer peripheral side. Therefore, even when the dust enters the bypass passage from the inflow port at any angle, the dust can be caused to collide with the wall surface of the bypass passage. Because the number of times of bending is large, the dust collides with the wall surface of the bypass passage a plurality of times.

Further, the dust that moves along with the air flow and does not collide with the wall surface of the bypass passage can be caused to once move in a direction to separate from the flow rate detecting element in a region from the first bent portion to the second bent portion. Thus, the collision energy that the dust has, which may damage the detecting element, can be reduced also in this case.

Further, in this flow rate measuring device, the bypass passage is bent a plurality of times, and hence the pressure loss of the entire bypass passage increases. However, the air is separated at the end of the inner wall surface of the first bent portion on the outer peripheral side on an inflow port projected plane. Thus, the air is contracted at the third bent portion, and the flow velocity value of the air becomes higher toward the inner wall surface of the third bent portion on the outer peripheral side. Then, the air traveling along the inner wall surface of the third bent portion on the outer peripheral side is separated at the end of the inner wall surface of the fourth bent portion on the inner peripheral side to travel toward the flow rate detecting element. Therefore, the flow velocity value of air passing above the flow rate detecting element is high, and thus the reduction in the flow velocity of air passing above the flow rate detecting element can be suppressed.

Second Embodiment

In a second embodiment of the present invention, description is made on of a structure that can further widen the detectable flow rate range and can further reduce the turbulence of air flowing above the flow rate detecting element 6 as compared to the previous first embodiment.

Figure 6:
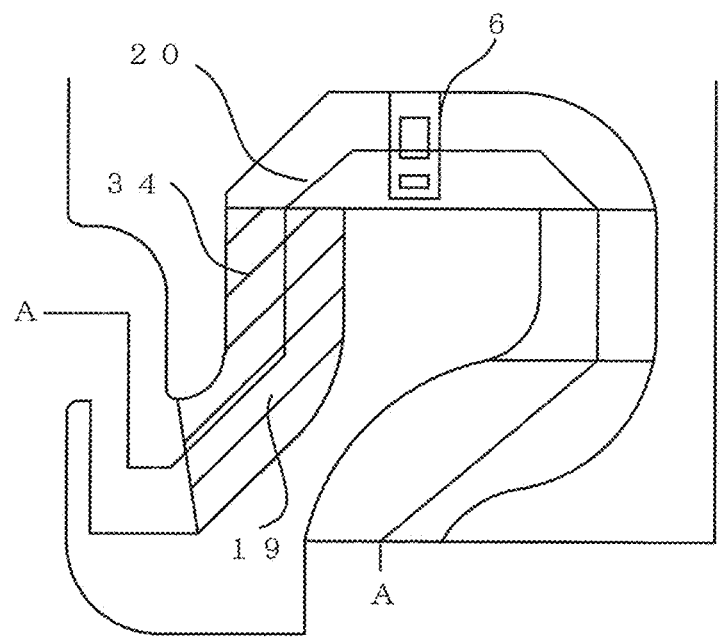
FIG. 6 is an enlarged front view of a periphery of a bypass passage of a flow rate measuring device according to a second embodiment of the present invention.
Figure 7A:
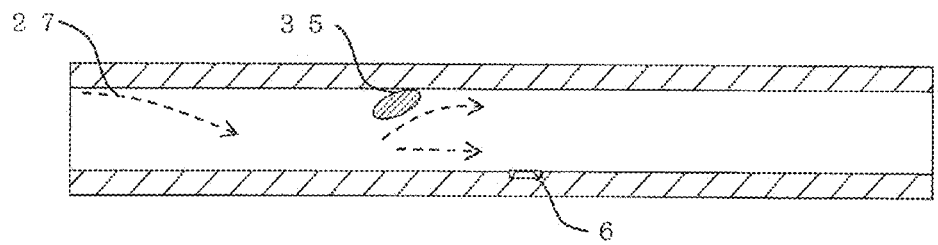
FIGS. 7A and 7B are views illustrating the comparison between the first embodiment and the second embodiment when the bypass passage is cut at a part indicated by the line A-A of FIG. 6.
Figure 7B:
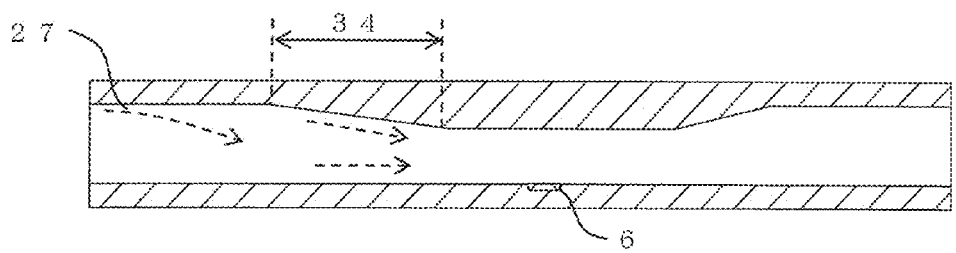

FIG. 6 is an enlarged front view of a periphery of a bypass passage of a flow rate measuring device according to the second embodiment of the present invention. Further, FIGS. 7A and 7B are views illustrating the comparison between the first embodiment and the second embodiment when the bypass passage is cut at a part indicated by the line A-A of FIG. 6. Specifically, FIG. 7A is a sectional view of the bypass passage when the bypass passage is cut at a part indicated by the line A-A of the flow rate measuring device according to the first embodiment, and FIG. 7B is a sectional view of the bypass passage when the bypass passage is cut at a part indicated by the line A-A of the flow rate measuring device according to the second embodiment.

In the second embodiment, as indicated by the shaded part of FIG. 7B, a contraction portion 34 is formed from the third bent portion 19 to the fourth bent portion 20. In the contraction portion 34, the height of the bypass passage 8 in the thickness direction of the wall surface opposed to the flow rate detecting element 6 is gradually reduced. Note that, other configurations are similar to those in the previous first embodiment, and hence the description thereof is omitted herein.

In the bypass passage 8 of the second embodiment, a passage sectional area of the bypass passage 8 in a part on the upstream with respect to a position at which the flow rate detecting element 6 is arranged is narrowed to contract the air. Therefore, the flow velocity of air at the third bent portion 19 is further increased as compared to that in the bypass passage 8 described in the previous first embodiment.

Further, by gradually reducing the height in the thickness direction of the wall surface opposed to the flow rate detecting element 6, the air is caused to flow in a direction directed toward the flow rate detecting element 6. Therefore, the flow velocity of air passing above the flow rate detecting element 6 can be increased, and it is possible to construct the flow rate measuring device having a wide air flow rate measureable range.

Further, as illustrated in FIG. 7A, in the bypass passage 8 of the first embodiment, although the flow velocity of air can be biased so that the flow velocity of the inner wall surface 30 of the third bent portion on the outer peripheral side increases due to the separation occurring at the end 32 of the inner wall surface of the first bent portion on the outer peripheral side, this bias is gradually lost. As a result, in a process of losing the bias, turbulence 35 is caused in the flow of air through the bypass passage 8, and hence the flow of air flowing above the flow rate detecting element 6 becomes unstable.

In contrast, as illustrated in FIG. 7B, in the bypass passage 8 of the second embodiment, the contraction portion 34 is provided so that the air can be guided above the flow rate detecting element 6 while maintaining the bias of the air flow velocity. Therefore, the turbulence 35 of air can be suppressed.

As described above, according to the second embodiment, while securing the dust tolerance capacity achieved in the flow rate measuring device according to the previous first embodiment, the detectable flow rate range can be further widened, and the turbulence of the air flow can be reduced.

Third Embodiment

In a third embodiment of the present invention, description is made on a structure in which, in order to secure a high dust tolerance capacity, a sub-outflow port is further provided in the middle of the bypass passage.

Figure 8:
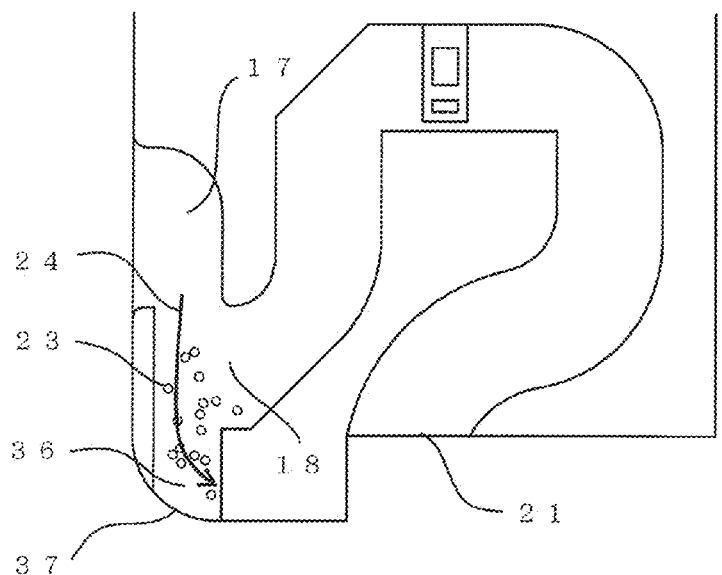
FIG. 8 is an enlarged front view of a periphery of a bypass passage of a flow rate measuring device according to a third embodiment of the present invention.

FIG. 8 is an enlarged front view of a periphery of a bypass passage of a flow rate measuring device according to the third embodiment of the present invention. In the third embodiment, a sub-bypass passage 36 connected to a mainstream, which is different from the bypass passage 8 of the previous first embodiment, is formed in the second bent portion 18, and a sub-outflow port 37 that is an outflow port of the sub-bypass passage 36 is formed to have an opening so as to be parallel to the mainstream flowing direction. Note that, other configurations are similar to those in the previous first embodiment, and hence the description thereof is omitted herein.

The dust 23 that has entered the bypass passage 8 has its flowing direction changed by the first bent portion 17, and then moves linearly until the second bent portion 18. In the second bent portion 18, the dust 23 continues the linear motion by the inertial force along the traveling direction. Therefore, the dust 23 travels toward the sub-bypass passage 36 to be discharged from the bypass passage 8 through the sub-outflow port 37.

With this, it is possible to prevent the dust 23 from reaching the flow rate detecting element 6. This effect is beneficial not only to the dust 23, but also to foreign matters entering the flow path, such as water droplets. Thus, it is possible to reduce the output fluctuation of the flow rate measuring device due to adhesion of foreign matters onto the flow rate detecting element 6.

Further, in a region in which the flow velocity value of the mainstream is high, the inertial force of air also increases, and thus air also flows through the sub-bypass passage 36. When air flows through the sub-bypass passage 36, the flow velocity value of air immediately before the flow rate detecting element 6 reduces. Therefore, the flow velocity value of the dust 23, which has traveled along with the air flow to reach the flow rate detecting element 6, also reduces. Note that, in the region in which the flow velocity value of the mainstream is high, even if air partially flows out from the sub-bypass passage 36, the flow velocity value of air flowing through the bypass passage is sufficient high, and hence the measuring range is not narrowed.

As described above, according to the third embodiment, by further forming the sub-outflow port in the middle of the bypass passage on the upstream side with respect to the position at which the flow rate detecting element is arranged, it is possible to construct the flow rate measuring device in which a high dust tolerance capacity is secured.

Fourth Embodiment

In a fourth embodiment of the present invention, description is made on a structure in which, in order to secure a high dust tolerance capacity, a sub-outflow port is further provided in the middle of the bypass passage in a manner different from that of the previous third embodiment.

Figure 9:
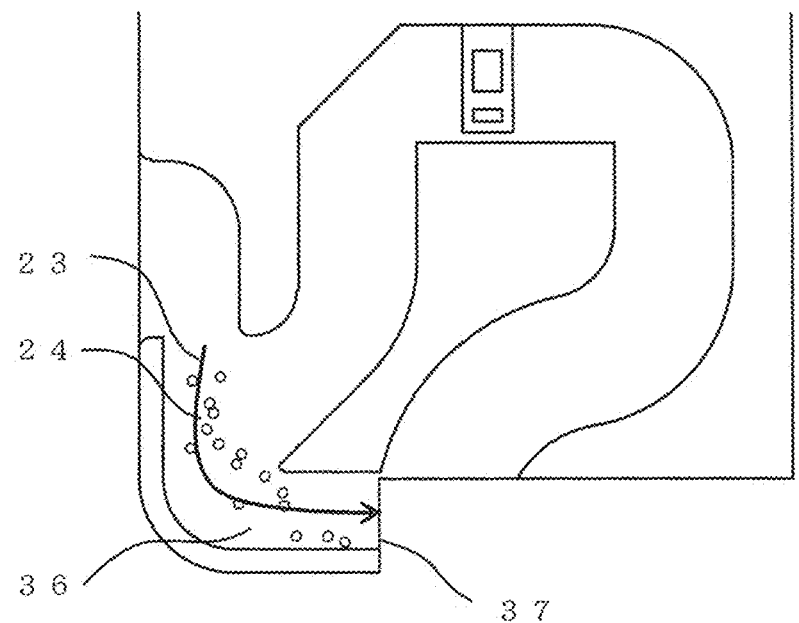
FIG. 9 is an enlarged front view of a periphery of a bypass passage of a flow rate measuring device according to a fourth embodiment of the present invention.

FIG. 9 is an enlarged front view of a periphery of a bypass passage of a flow rate measuring device according to the fourth embodiment of the present invention. In the fourth embodiment, unlike the flow rate measuring device of the previous third embodiment, the sub-outflow port 37 is formed to have an opening so as to be perpendicular to the mainstream flowing direction. Note that, other configurations are similar to those in the previous first embodiment, and hence the description thereof is omitted herein.

By forming the sub-outflow port 37 to have an opening so as to be perpendicular to the mainstream flowing direction, due to the effect of the negative pressure generated in the portion of the sub-outflow port 37, air easily flows from the sub-bypass passage 36. As a result, the effect of discharging the dust 23 and the foreign matters increases as compared to the previous third embodiment.

As described above, according to the third embodiment, by devising the direction of the sub-outflow port, it is possible to construct the flow rate measuring device in which a higher dust tolerance capacity is secured as compared to the previous third embodiment.

Fifth Embodiment

In a fifth embodiment of the present invention, description is made on a structure for securing a high dust tolerance capacity, which is different from those of the previous third and fourth embodiments.

Figure 10:
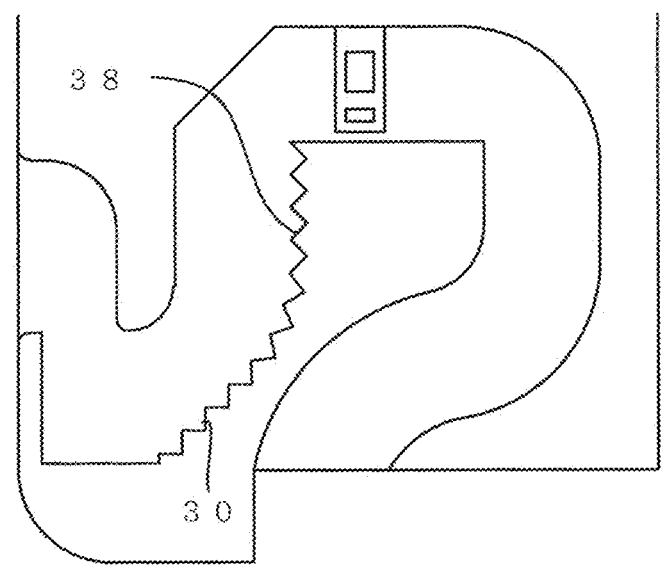
FIG. 10 is an enlarged front view of a periphery of a bypass passage of a flow rate measuring device according to a fifth embodiment of the present invention.

FIG. 10 is an enlarged front view of a periphery of a bypass passage of a flow rate measuring device according to the fifth embodiment of the present invention. In the fifth embodiment, the inner wall surface 30 of the third bent portion on the outer peripheral side is formed into a corrugated shape 38. Note that, other configurations are similar to those in the previous first embodiment, and hence the description thereof is omitted herein.

By forming the inner wall surface 30 of the third bent portion on the outer peripheral side into the corrugated shape 38, the dust 23 is subjected to centrifugal movement at the second bent portion 18, and the dust 23 can be caused to collide with the inner wall surface 30 of the third bent portion on the outer peripheral side at a substantially perpendicular collision angle. Therefore, the effect of reducing the collision energy of the dust 23 is increased.

As described above, according to the fifth embodiment, even by forming a corrugated shape on the inner wall surface of the third bent portion on the outer peripheral side, it is possible to construct the flow rate measuring device in which a high dust tolerance capacity is secured.

What is claimed is:

1. A flow rate measuring device, comprising:
   a bypass passage for causing a fluid to be measured, which flows through a mainstream path, to partially flow through the bypass passage as a bypass fluid;
   a flow rate detecting element arranged inside the bypass passage; and
   a flow rate measuring circuit arranged outside the bypass passage, the flow rate measuring circuit being electrically connected to the flow rate detecting element so as to measure a flow rate of the fluid to be measured from a result detected by the flow rate detecting element based on a fluid passing above the flow rate detecting element,
   wherein the bypass passage comprises:
      an inflow port opposed to an upstream side in a mainstream flowing direction of the fluid to be measured and opened in a plane perpendicular to the mainstream flowing direction, for guiding the bypass fluid into the bypass passage;

an outflow port for causing the bypass fluid that has passed through the bypass passage to join with the mainstream path; and a plurality of bent portions formed between the inflow port and the outflow port so as to bend the bypass passage, wherein the plurality of bent portions comprise:

a first bent portion for bending the bypass passage connected to the inflow port in a direction to separate from the flow rate measuring circuit;

a second bent portion for bending the bypass passage bent at the first bent portion so as to be parallel to the mainstream flowing direction;

a third bent portion for bending the bypass passage bent at the second bent portion in a direction of the flow rate measuring circuit so as to be perpendicular to the mainstream flowing direction; and a fourth bent portion for bending the bypass passage bent at the third bent portion so as to be parallel to the mainstream flowing direction, wherein the flow rate detecting element is arranged inside the bypass passage in a part after bending at the fourth bent portion, and wherein a route connecting the inflow port and the flow rate detecting element as a straight line is blocked by an inner wall surface of the bypass passage on an outer peripheral side, which is formed between the first bent portion and the second bent portion.

2. A flow rate measuring device according to claim 1, wherein the bypass passage comprises, in a part formed between the third bent portion and the fourth bent portion, a contraction portion in which a height of the bypass passage in a thickness direction of a wall surface opposed to the flow rate detecting element gradually reduces so as to gradually reduce a passage sectional area of the bypass passage from the third bent portion to the fourth bent portion.

3. A flow rate measuring device according to claim 1, wherein the bypass passage further comprises a sub-outflow port for causing the bypass fluid passing through the bypass passage to join with the mainstream path before reaching the outflow port, and wherein the sub-outflow port is formed in the bypass passage on an upstream with respect to a position at which the flow rate detecting element is arranged.

4. A flow rate measuring device according to claim 3, wherein the sub-outflow port is opened in a plane parallel to the mainstream flowing direction.

5. A flow rate measuring device according to claim 3, wherein the sub-outflow port is opened in a plane perpendicular to the mainstream flowing direction.

6. A flow rate measuring device according to claim 1, wherein the third bent portion has an inner wall surface on an outer peripheral side, which is formed into a corrugated shape.

7. A flow rate measuring device according to claim 2, wherein the third bent portion has an inner wall surface on an outer peripheral side, which is formed into a corrugated shape.

8. A flow rate measuring device according to claim 3, wherein the third bent portion has an inner wall surface on an outer peripheral side, which is formed into a corrugated shape.

9. A flow rate measuring device according to claim 4, wherein the third bent portion has an inner wall surface on an outer peripheral side, which is formed into a corrugated shape.

10. A flow rate measuring device according to claim 5, wherein the third bent portion has an inner wall surface on an outer peripheral side, which is formed into a corrugated shape.

* * * * *